(12) United States Patent
Mahasenan et al.

(10) Patent No.: US 12,101,725 B2
(45) Date of Patent: Sep. 24, 2024

(54) TRANSMISSION POWER CONTROL

(71) Applicant: Apple Inc., Cupertino, CA (US)

(72) Inventors: Arun Vijayakumari Mahasenan, Fremont, CA (US); Venkateswara Rao Manepalli, San Jose, CA (US); Sarvesh Kumar Varatharajan, Sunnyvale, CA (US); Yaranama Venkata Ramana Dass, Belmont, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 17/481,720

(22) Filed: Sep. 22, 2021

(65) Prior Publication Data

US 2023/0086121 A1 Mar. 23, 2023

(51) Int. Cl.
*H04W 52/36* (2009.01)
*H04L 5/00* (2006.01)
(Continued)

(52) U.S. Cl.
CPC .......... *H04W 52/367* (2013.01); *H04L 5/0053* (2013.01); *H04W 52/241* (2013.01); *H04W 52/282* (2013.01)

(58) Field of Classification Search
CPC ............. H04W 52/367; H04W 52/241; H04W 52/282; H04L 5/0053; H04L 1/0026; H04L 5/0055
See application file for complete search history.

(56) References Cited

U.S. PATENT DOCUMENTS 7,764,966 B2 7/2010 Derryberry et al.
7,936,690 B2 5/2011 Willenegger
(Continued)

FOREIGN PATENT DOCUMENTS

| CN | 104210742 B | 2/2018 |
|---|---|---|
| KR | 2009-0060951 A | 6/2009 |
| WO | WO-2017/215167 A1 | 12/2017 |

OTHER PUBLICATIONS

Kim, S. et al., "Quiet ACK: ACK Transmit Power Control in IEEE 802.11 WLANs," IEEE INFOCOM 2017—IEEE Conf. on Computer Communications, 9 pages (2017).
Viswanathan, H., "Adaptive Transmit Power Control Based on Signal Strength and Frame Loss Measurements for WLANs," Thesis submitted to Rutgers, The State University of New Jersey, 58 pages (Oct. 2009).

*Primary Examiner* — Hoang-Chuong Q Vu
(74) *Attorney, Agent, or Firm* — Sterne, Kessler, Goldstein & Fox P.L.L.C.

(57) ABSTRACT

Some aspects of this disclosure include apparatuses and methods for implementing transmission power control. Some aspects relate to an electronic device including a transceiver configured to communicate with a second electronic device and a processor communicatively coupled to the transceiver. The processor is configured to receive an identification information of the second electronic device and receive, from the second electronic device, at least one of a plurality of feedback signals. The plurality of feedback signals includes a first feedback signal generated based on a link quality query from the electronic device and a second feedback signal including an encoded channel status information embedded within an acknowledgment (ACK) frame from the second electronic device. Based on the received identification information and the at least one of the plurality of feedback signals, the processor is configured to adjust transmission power of a signal to be transmitted to the second electronic device.

16 Claims, 7 Drawing Sheets

(51) Int. Cl.
*H04W 52/24* (2009.01)
*H04W 52/28* (2009.01)

(56) References Cited

U.S. PATENT DOCUMENTS

| | | | |
|---|---|---|---|
| 8,599,731 B2 | 12/2013 | Jeon et al. | |
| 8,706,026 B2 | 4/2014 | Truong et al. | |
| 9,288,814 B2 | 3/2016 | Yavuz et al. | |
| 9,397,737 B2 | 7/2016 | Seok et al. | |
| 9,554,333 B2 | 1/2017 | Li et al. | |
| 9,692,249 B2 | 6/2017 | Ito et al. | |
| 10,225,804 B2 | 3/2019 | Bharadwaj et al. | |
| 10,296,064 B2 * | 5/2019 | Piipponen | G06F 1/3215 |
| 10,757,756 B2 | 8/2020 | Chen et al. | |
| 10,862,635 B2 | 12/2020 | Huang et al. | |
| 10,863,377 B2 | 12/2020 | Yun et al. | |
| 11,490,338 B1 * | 11/2022 | Khawand | H04W 52/285 |
| 2003/0003905 A1 | 1/2003 | Shvodian | |
| 2005/0036441 A1 * | 2/2005 | Laroia | H04W 52/60 |
| | | | 370/318 |
| 2005/0143119 A1 | 6/2005 | Chandra et al. | |
| 2009/0005102 A1 * | 1/2009 | Das | H04W 52/325 |
| | | | 455/522 |
| 2013/0331137 A1 * | 12/2013 | Burchill | H04L 1/20 |
| | | | 455/501 |
| 2015/0319700 A1 | 11/2015 | Oteri et al. | |
| 2017/0005770 A1 * | 1/2017 | Shimezawa | H04L 1/0027 |
| 2017/0332334 A1 * | 11/2017 | Liu | H04W 52/265 |
| 2018/0302197 A1 * | 10/2018 | He | H04L 5/14 |
| 2018/0307253 A1 * | 10/2018 | Weiler | G05D 7/0617 |
| 2019/0045453 A1 | 2/2019 | Da Silva et al. | |
| 2022/0046433 A1 * | 2/2022 | Bedekar | H04W 76/10 |
| 2022/0408377 A1 * | 12/2022 | Kotaru | H04W 52/367 |

\* cited by examiner

TRANSMISSION POWER CONTROL

BACKGROUND

Field

This disclosure generally relates to techniques for implementing transmission power control.

Related Art

Low-power devices can communicate with each other using different network technologies and network protocols. Some of these network technologies may not use power control, and transmitter devices may use fixed transmission power irrespective of channel conditions. Alternatively, some network technologies may use transmission power control techniques that have high overhead. For example, some network technologies may use transmission power control techniques that have high energy and bandwidth costs.

SUMMARY

Some aspects of this disclosure include apparatuses and methods for implementing transmission power control. For example, some aspects of this disclosure are directed to transmission power control for low-power devices that can improve the devices' power (e.g., battery life) without degrading the quality of communication between the devices. Additionally, the transmission power control mechanisms of this disclosure can improve channel noise and interference. Also, the transmission power control mechanisms of this disclosure can make the communication between the devices to better coexist with other communication technologies (such as, but not limited to, Wireless Local Area Network (WLAN) and/or Bluetooth®).

According to some aspects, the transmission power control mechanisms of this disclosure can include using, at a transmitter device, a plurality of feedback signals from a receiver device to adaptively control the transmission power. Additionally, or alternatively, the transmission power control mechanisms of this disclosure can include choosing, at the transmitter device, one or more of the plurality of feedback signals based on, for example, identification information of the receiver device. Additionally, the transmission power control mechanisms of this disclosure can include using sensor data from one or more sensors (e.g., motion sensors) of the transmitter device for controlling the transmission power.

Some aspects of this disclosure relate to an electronic device including a transceiver configured to communicate with a second electronic device and a processor communicatively coupled to the transceiver. The processor can be configured to receive an identification information of the second electronic device and receive, from the second electronic device, at least one of a plurality of feedback signals. The plurality of feedback signals includes a first feedback signal generated based on a link quality query from the electronic device and a second feedback signal including an encoded channel status information embedded within an acknowledgment (ACK) frame from the second electronic device. Based on the received identification information and the at least one of the plurality of feedback signals, the processor can be configured to adjust transmission power of a signal to be transmitted to the second electronic device.

In some aspects, the processor can be configured to adjust the transmission power based on the first feedback signal and the second feedback signal in response to the received identification information satisfying a condition.

In some aspects, the processor can be configured to generate the link quality query for the first feedback signal based on the second feedback signal associated with a previous time interval and the transmission power associated with a signal transmitted in the previous time interval.

In some aspects, the processor can be further configured to determine that the second feedback signal associated with the previous time interval and the transmission power associated with the signal transmitted in the previous time interval satisfy a second condition. In response to the determination, the processor can be further configured to generate the link quality query for the first feedback signal and to transmit, using the transceiver, the link quality query to the second electronic device. The processor is further configured to receive, using the transceiver, the first feedback signal from the second electronic device and adjust, based on the first feedback signal, the transmission power of the signal to be transmitted to the second electronic device.

In some aspects, the processor can be configured to adjust the transmission power using a control mechanism applied to the second feedback signal, where the control mechanism is initialized using the first feedback signal.

In some aspects, the encoded channel status information are encoded in a frame control field of the ACK frame from the second electronic device. The encoded channel status information representing a first value indicates that the transmission power is to be unchanged. The encoded channel status information representing a second value indicates that the transmission power is to be reduced by a first amount. The encoded channel status information representing a third value indicates that the transmission power is to be increased by a second amount. The encoded channel status information representing a fourth value indicates that the transmission power is to be increased by a third amount different from the second amount.

In some aspects, the processor can be configured to adjust the transmission power based on the received identification information, the least one of the plurality of feedback signals, and no ACK frame from the second electronic device in response to signal transmitted to the second electronic device.

In some aspects, the electronic device further includes a sensor configured to generate sensor data. The processor can be configured to adjust the transmission power based on the received identification information, the least one of the plurality of feedback signals, and the sensor data. In some examples, the sensor includes a motion sensor and the sensor data includes information associated with a motion of the electronic device.

Some aspects of this disclosure relate to a method including receiving, using a first electronic device, an identification information of a second electronic device and receiving, using the first electronic device and from the second electronic device, at least one of a plurality of feedback signals. The plurality of feedback signals include a first feedback signal generated based on a link quality query from the first electronic device and a second feedback signal comprising an encoded channel status information embedded within an acknowledgment (ACK) frame from the second electronic device. The method further includes adjusting transmission power of a signal to be transmitted to the second electronic device based on the received identification information and the at least one of the plurality of feedback signals.

Some aspects of this disclosure relate to a non-transitory computer-readable medium storing instructions that when executed by a processor of an electronic device, cause the processor to perform operations including receiving an identification information of a second electronic device and receiving, from the second electronic device, at least one of a plurality of feedback signals. The plurality of feedback signals include a first feedback signal generated based on a link quality query from the first electronic device and a second feedback signal comprising an encoded channel status information embedded within an acknowledgment (ACK) frame from the second electronic device. The operations further include adjusting transmission power of a signal to be transmitted to the second electronic device based on the received identification information and the at least one of the plurality of feedback signals.

This Summary is provided for purposes of illustrating some aspects of this disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
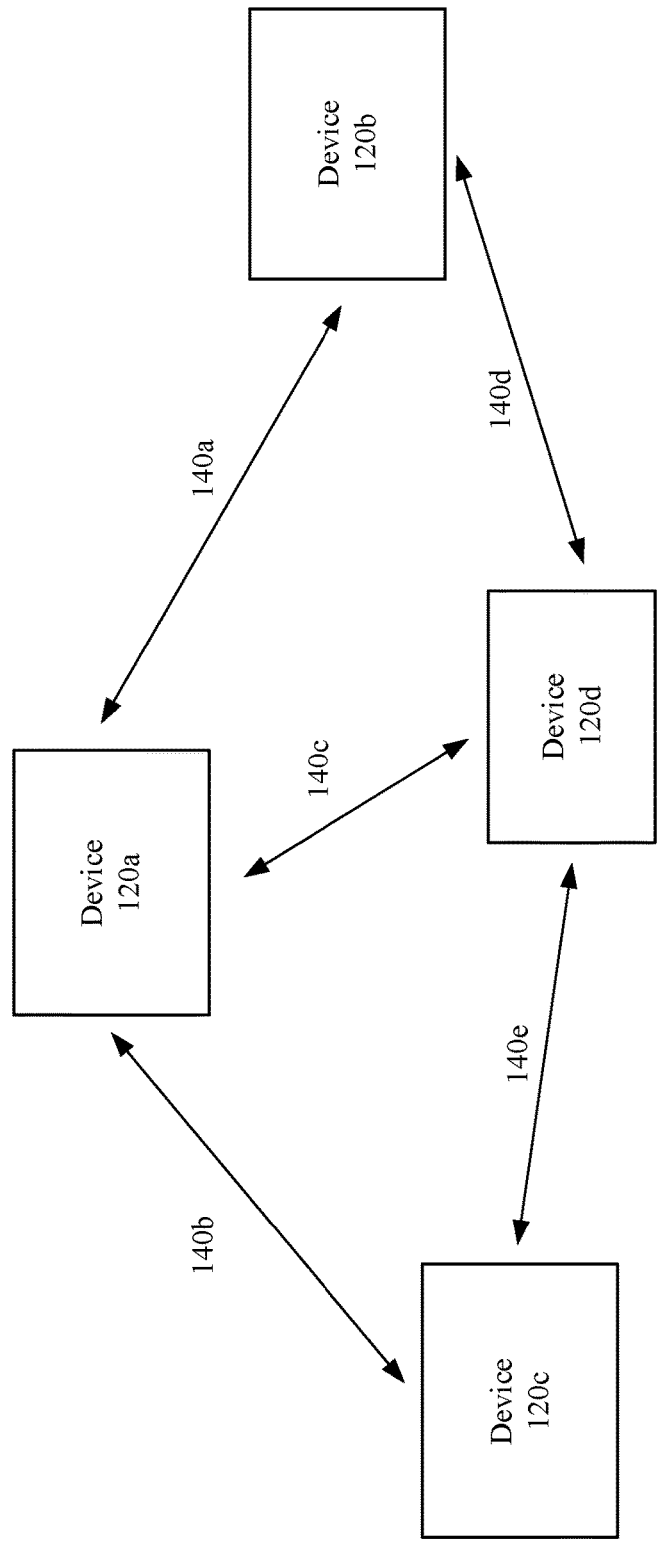
FIG. 1 illustrates an example system implementing transmission power control mechanisms, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing transmission power control. Some aspects of this disclosure can be applied to communication protocols for low-rate wireless personal area networks (LR-WPANs) such as, but not limited to low-power mesh networking technology. For example, some aspects of this disclosure can be applied to communication protocols such as, but not limited to, Institute of Electrical and Electronics Engineers (IEEE) 802.15 standard. In a non-limiting example, some aspects of this disclosure can be applied to IEEE 802.15.4 such as Thread technology. However, the aspects of this disclosure can be applied to any low-power, low-rate, and/or short range communication protocol and/or other communication protocols.

FIG. 1 illustrates an example system 100 implementing transmission power control mechanisms, according to some aspects of the disclosure. Example system 100 is provided for the purpose of illustration only and does not limit the disclosed aspects. System 100 may include, but it not limited to, devices 120a-120d (also collectively referred to herein as device 120 or a plurality of devices 120). The plurality of devices 120a-120d may include, but are not limited to, wireless communication devices, smart phones (e.g., user equipment), laptops, desktops, tablets, personal assistants, monitors, multimedia devices (e.g., televisions), human interface devices, speaker devices, headphone devices, wearable devices, medical sensors, gaming devices, vehicle multimedia centers, Internet-of Things (IoT) devices, and the like.

The connections 140a-140e are illustrated in FIG. 1 as possible connections between the plurality of devices 120a-120d. Additionally, or alternatively, based on the disclosure herein, a person of ordinary skill in art will understand that each of the plurality of devices 120a-120d can form one or more connections with other devices 120a-120d. As one example, device 120a can form connection 140a with device 120b, can form connection 140b with device 120c, and can form connection 140c with device 120d. As another example, device 120b can form connection 140d with device 120d. Device 120c can form connection 140e with device 120d.

One or all of the connections 140a-140e (and other connections between other devices 120a-120d) may be wireless and may include, but are not limited to, a wireless local network connection (such as but not limited to Institute of Electrical and Electronics Engineers (IEEE) 802.11 standard, which is sometimes referred to as WLAN or Wi-Fi), a wireless connection based on IEEE 802.15 standard, or based on Bluetooth® protocol, Bluetooth® Low Energy protocol, or a Bluetooth® Low Energy Long Range protocol (from the Bluetooth Special Interest Group of Kirkland, Washington), a cellular network connection (such as, but not limited to, Universal Mobile Telecommunications System (UMTS), the Long-Term Evolution (LTE), connection based on 3G/4G/5G networks), or any other wireless connections using standardized and/or proprietary protocols. In some aspects, one, multiple, or all of connections 140a-140d may be implemented as wired connections between each of the respective devices.

Some aspects of this disclosure are discussed with respect to communication between device 120a and device 120b on connection 140a. In some examples, connection 140a is also referred to as a communication link between devices 120a and 120b. According to some aspects, device 120a (e.g., a transmitter device) can communicate with device 120b (e.g., a receiver device) over connection 140a. For example, device 120a can transmit one or more packets or frames to device 120b. Additionally, device 120b can be configured to transmit one or more feedback signals to device 120a. According to some aspects, the feedback signals can provide information about the quality of connection 140a (e.g., link quality information). Based on the feedback signal(s) and the received link quality information, device 120a can control its transmission power.

According to some aspects, device 120a can choose one or more of the feedback signals based on a type of device 120b to adjust its transmission power. In some examples, the type of device 120b can be determined based on identification information received from device 120b.

In some aspects, a first feedback signal can include a link metrics feedback provided by device 120b. In this example, device 120a can periodically transmit link metrics probe requests to device 120b. In response to the link metrics probe requests, device 120b can measure the quality of the link (e.g., connection 140a) between devices 120a and 120b and transmit link metrics probe response to device 120a. The link metrics probe response can include the link quality information for the link (e.g., connection 140a) between devices 120a and 120b. According to some examples, the link quality information in the link metrics probe response can include, but is not limited to, Received Signal Strength Indicator (RSSI), Packet Error Rate (PER), Signal to Noise Ratio (SNR), and the like. For example, the link quality information in the link metrics probe response can include link margin that indicates the quality of the link (e.g., connection 140a). In one example, the link metrics probe response from device 120b can include link margin TLV (type-length-value or tag-length-value).

In some aspects, a second feedback signal can include an encoded channel status information embedded within an acknowledgment (ACK) frame. In some examples, device 120b can transmit an ACK frame to device 120a in response to a data packet/frame that device 120b receives from device 120a. In a non-limiting example, device 120b can transmit the ACK frame after each unicast packet/frame from device 120a. In these aspects, device 120b can include the link quality information as the encoded channel status information that embedded within the ACK frame (herein referred to as encoded ACK frame). Although some examples of this disclosure are discussed with respect to ACK frames, the aspect of this disclosure can also be applied to ACK packets.

In some aspects, a third feedback signal can include a negative ACK (NACK) frame and/or lack of the ACK frame. For example, if device 120a transmits a frame to device 120b and receives a NACK frame (or does not receive an ACK frame) from device 120b, device 120a can use this feedback signal in adjusting its transmission power.

According to some aspects, device 120a can control its transmission power based on at least one of the feedback signals discussed above and the identification information of device 120b. In some examples, device 120a can receive the identification information of device 120b during the connection establishment process to establish connection 140a. Additionally, or alternatively, device 120a can receive the identification information of device 120b during communicating data between devices 120a and 120b.

According to some aspects, if the identification information of device 120b satisfies a first condition, device 120a can choose to use the link metrics feedback. In a non-limiting example, device 120a can receive the identification information of device 120b and can determine, based on the identification information, whether both devices 120a and 120b have a same manufacturer. In this example, if devices 120a and 120b do not have the same manufacturer, device 120a can choose to use the link metrics feedback. The aspects of this disclosure are not limited to this example, and device 120a can use other conditions to determine to use the link metrics feedback. In some examples, device 120a can use the link metrics feedback alone or in combination with NACK/no ACK feedback.

According to some aspects, if the identification information of device 120b satisfies a second condition, device 120a can choose to use the encoded ACK frame. In a non-limiting example, device 120a can receive the identification information of device 120b and can determine, based on the identification information, whether both devices 120a and 120b have a same manufacturer and/or whether device 120b is a device associated with device 120a. In this example, if devices 120a and 120b do not have the same manufacturer but device 120b is a device associated with device 120a, device 120a can choose to use the encoded ACK frame. In this example, device 120b being a device associated with device 120a can include, for example, an accessory device that is to operate with device 120a but devices 120a and 120b do not have the same manufacturer. The aspects of this disclosure are not limited to this example, and device 120a can use other conditions to determine to use the encoded ACK frame. In some examples, device 120a can use the encoded ACK frame alone or in combination with NACK/no ACK feedback.

According to some aspects, if the identification information of device 120b satisfies a third condition, device 120a can choose to use a combination of the link metrics feedback and the encoded ACK frame. In a non-limiting example, device 120a can receive the identification information of device 120b and can determine, based on the identification information, whether both devices 120a and 120b have a same manufacturer. In this example, if devices 120a and 120b have the same manufacturer, device 120a can choose to use the combination of the link metrics feedback and the encoded ACK frame. The aspects of this disclosure are not limited to this example, and device 120a can use other conditions to determine to use the combination of the link metrics feedback and the encoded ACK frame. In some examples, device 120a can use the combination of the link metrics feedback and the encoded ACK frame alone or in combination with NACK/no ACK feedback.

According to some aspects, when using the combination of the link metrics feedback and the encoded ACK frame, device 120a can periodically transmit link metrics probe requests to device 120b to send the link metrics feedback (e.g., the link metrics probe response). In some examples, the intervals between the link metrics probe requests can be fixed intervals. In these aspects, device 120a can use the combination of the link metrics feedback and the encoded ACK frame to adjust its transmission power. For example, before transmitting each signal (e.g., each packet/frame) to device 120b, device 120a can adjust its transmission power based on the combination of the latest link metrics feedback and the latest encoded ACK frame. In some examples, device 120a can use the link metrics feedback for coarse correction of its transmission power and can use the encoded ACK frame for fine correction of its transmission power. Additionally, or alternatively, device 120a can use the encoded ACK frame and a corresponding control mechanism to adjust its transmission power. Device 120a can use the link metrics feedback to initialize the control mechanism.

According to some other aspects, when using the combination of the link metrics feedback and the encoded ACK frame, device 120a can mainly use the encoded ACK frame and use the link metrics feedback if one or more conditions are satisfied. In some examples, this method is also referred to as opportunistic probing. For example, and as discussed in more detail below, after receiving each encoded ACK frame, device 120a can check one or more conditions. If the one or more conditions are not satisfied, device 120a can continue to use the encoded ACK frame for transmission power control. If the one or more conditions are satisfied, then device 120a can request the link metrics feedback from device 120b by, for example, transmitting the link metric probe request. Then, device 120a can use the link metrics feedback (alone or in combination with encoded ACK frame) to adjust its transmission power. In this example, device 120a requests for the link metrics feedback (e.g., transmits the link metrics probe request) when the one or more conditions are satisfied. According to some aspects, the one or more conditions can be based on the current transmission power of device 120a and/or the link quality information in the encoded ACK frame. By using the link metrics feedback less often (e.g., using the link metrics feedback when the condition(s) is satisfied), device 120a can more efficiently control and adjust its transmission power. Therefore, device 120a can improve its own power consumption. Additionally, channel bandwidth and overhead can be improved as the number of link metrics probe requests and responses can be decreased. Device 120b's power consumption can also be improved as device 120b can transmit less link metrics probe responses.

Figure 2:
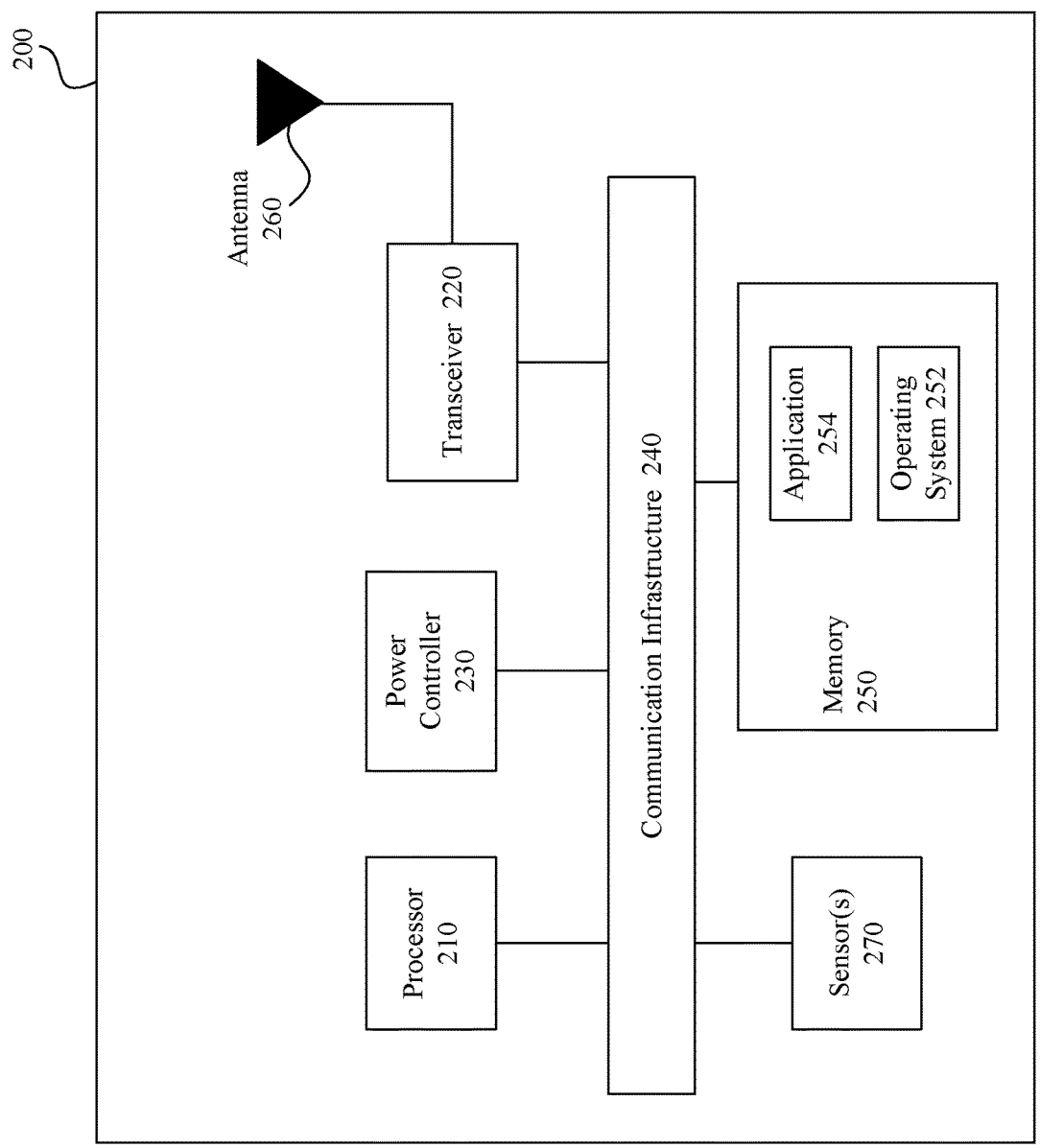
FIG. 2 illustrates a block diagram of an example wireless system of an electronic device implementing transmission power control mechanisms, according to some aspects of the disclosure.

FIG. 2 illustrates a block diagram of an example wireless system 200 of an electronic device implementing transmission power control mechanisms, according to some aspects of the disclosure. System 200 may be any of the electronic devices (e.g., devices 120) of system 100. System 200 includes processor 210, one or more transceivers (e.g., transceiver 220), power controller 230, communication infrastructure 240, memory 250, operating system 252, antenna 260, and sensor(s) 270. Illustrated systems are provided as exemplary parts of wireless system 200, and system 200 can include other circuit(s) and subsystem(s). Also, although the systems of wireless system 200 are illustrated as separate components, the aspects of this disclosure can include any combination of these components, less components, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210, transceiver 220, and/or power controller 230. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, audio applications, radio streaming, video streaming, remote control, gaming application(s), health applications, one or more applications associated with a vehicle, one or more applications associated with an IoT device, and/or other user applications.

System 200 can also include communication infrastructure 240. Communication infrastructure 240 provides communication between, for example, processor 210, transceiver 220, power controller 230, and memory 250. In some implementations, communication infrastructure 240 may be a bus. Processor 210 and/or power controller 230 together with instructions stored in memory 250 and transceiver 220 perform operations enabling wireless system 200 to implement the transmission power control mechanisms as described herein. Additionally, or alternatively, power controller 230 with transceiver 220 performs operations enabling wireless system 200 to implement the transmission power control mechanisms as described herein.

Transceiver 220 transmit and receive communications signals that support the transmission power control mechanisms, according to some aspects, and may be coupled to antenna 260. (Herein, transceivers can also be referred to as radios). Antenna 260 may include one or more antennas that may be the same or different types. Transceiver 220 enables system 200 to communicate with other devices that may be wired and/or wireless. In some examples, transceiver 220 can include processors, controllers, radios, sockets, plugs, buffers, and like circuits/devices used for connecting to and communication on networks. According to some examples, transceivers 220 includes one or more circuits to connect to and communicate on wired and/or wireless networks.

According to some aspects of this disclosure, transceiver 220 can include low-power subsystem, a cellular subsystem, a WLAN subsystem, and/or a Bluetooth® subsystem, each including its own radio transceiver and protocol(s) as will be understood by those skilled arts based on the discussion provided herein. In some implementations, transceiver 220 can include more or fewer systems for communicating with other devices.

In some examples, transceiver 220 can include one or more circuits (including a cellular transceiver) for connecting to and communicating on (LR-WPANs) such as, but not limited to low-power mesh networking technology. For example, transceiver 220 can include one or more circuits configured to operate based on communication protocols such as, but not limited to, IEEE 802.15 standard (e.g., IEEE 802.15.4 such as Thread technology).

In some examples, transceiver 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Additionally, or alternatively, transceiver 220 can include one or more circuits (including a Bluetooth® transceiver) to enable connection(s) and communication based on, for example, Bluetooth® protocol, the Bluetooth® Low Energy protocol, or the Bluetooth® Low Energy Long Range protocol. Additionally, transceiver 220 can include one or more circuits (including a WLAN transceiver) to enable connection(s) and communication over WLAN networks such as, but not limited to, networks based on standards described in IEEE 802.11.

Sensor(s) 270 can include one or more sensors within and/or coupled to system 200. For example, sensor(s) 270 can include one or more motion sensors configured to provide motion information related to system 200. In some examples, the motion sensors can determine whether system 200 is moving. Additionally, or alternatively, the motion sensors can determine a distance (e.g., an approximate distance) that system 200 is moved within a time period, can determine the speed (e.g., an approximate speed) of system 200, and/or can determine an acceleration (e.g., an approximate acceleration) of system 200. Although a motion sensor is discussed, other sensors (such as, but not limited to, an accelerometer or shock sensor) can be used for sensors 270. Sensor data from sensors 270 (e.g., motion information) can be used by power controller 230 to adjust and control transmission power of system 200.

According to some aspects of this disclosure, processor 210, power controller 230, and/or transceiver 220 (alone or in combination with computer instructions stored within memory 250), implement the transmission power control mechanisms. For example, power controller 230 can use the transmission power control mechanisms of this disclosure to control the power of the signal transmitted by transceiver 220. Although power controller 230 is illustrated as a separate system from processor 210 and transceiver 220, the structures and/or functionalities of power controller 230 can be part of processor 210 and/or transceiver 220.

Figure 3:
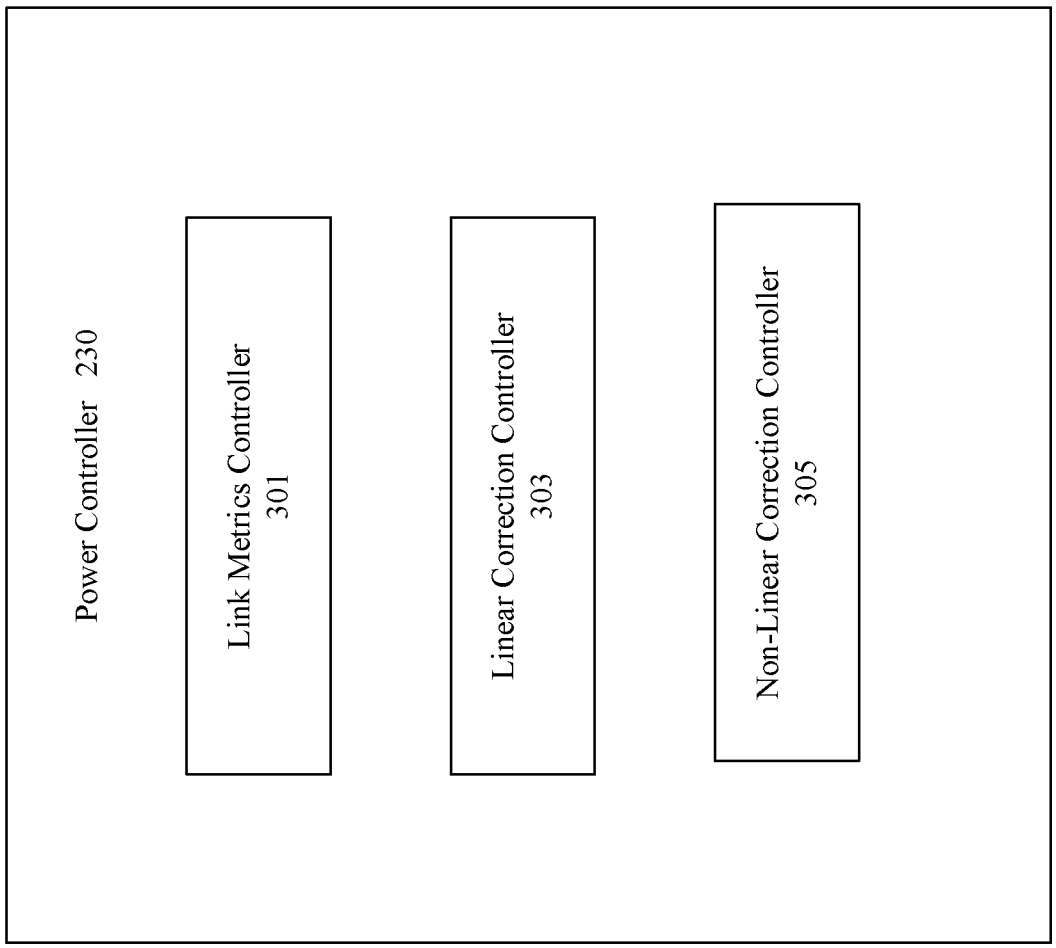
FIG. 3 illustrates block diagram of an exemplary power controller implementing transmission power control mechanisms, according to some aspects of the disclosure.

FIG. 3 illustrates an exemplary block diagram of power controller 230 implementing transmission power control mechanisms, according to some aspects of the disclosure. Power controller 230 can include link metrics controller 301, linear controller 303, and non-linear controller 305, which can be implemented using one or more processors, e.g., processor 210. Also, although power controller 230 is illustrated as having separate components, the aspects of this disclosure can include any combination of these components, less components, or more components.

According to some aspects, link metrics controller 301 can be configured to adjust and control the transmission power based the link metrics feedback provided by, for example, device 120b. As discussed above, a transmitter device (e.g., device 120a) can transmit link metrics probe requests to a receiver device (e.g., device 120b). In response to the link metrics probe requests, the receiver device can measure the quality of the link between the transmitter and receiver devices. The receiver device can transmit link metrics probe response(s) to the transmitter device. The link metrics probe response can include the link quality information for the link. According to some examples, the link quality information in the link metrics probe response can include, but is not limited to, RSSI, PER, SNR, link margin (that indicates the quality of the link), and the like. Link metrics controller 301 can use the link quality information in the link metrics feedback to adjust the transmission power of the transmitter device. In a non-limiting example, link metrics controller 301 can use a weighted average equation to adjust the transmission power. For example, $$P(t)=a*P(t-1)-(1-a)*(LM-SP) \quad (1)$$

In this example, P(t) is the transmission power for time (e.g., time slot) t. P(t−1) is the transmission power for time t−1 (e.g., previous time slot). In this example, "a" is a coefficient used for the weighted average. LM is the received link margin determined from the link metrics feedback. Also, SP is a set point. In some examples, link metrics controller 301 adjusts the transmission power to be close to the set point SP. The aspects of this disclosure are not limited to the weighted average and other control mechanisms can be used for link metrics controller 301.

According to some aspects, link metrics controller 301 provides a coarse correction/adjustment of the transmission power. In a non-limiting example, the coarse adjustment is performed when the error (e.g., the difference between the link margin and set point (LM−SP)) is more than about 3 dB. However, the aspects of this disclosure can include other values of error for coarse adjustment. In a non-limiting example, link metrics controller 301 can be an absolute correction controller.

According to some aspects, linear correction controller 303 can be configured to adjust and control the transmission power based on NACK frame(s) and/or lack of ACK frame(s). For example, the transmitter device (e.g., device 120a) transmits a packet/frame (e.g., a data packet/frame) to the receiver device (e.g., device 120b). But the transmitter device does not receive any ACK frame from the receiver device or the transmitter device receives a NACK frame. In response, transmitter device can determine that its frame was not received (or was not correctly decoded) by the receiver device. Linear correction controller 303 can use the information associated with the NACK frame or the lack of ACK to adjust the transmission power of the transmitter device. In one example, linear correction controller 303 can adjust (e.g., increase) the transmission power by a fixed value. In a non-limiting example, the fixed value can be about 10 dB. However, the aspects of this disclosure can include other fixed values. Additionally, or alternatively, linear correction controller 303 can adjust (e.g., increase) the transmission power in other predetermined manners. In another example, in addition to, or in alternative to, adjusting the transmission power, linear correction controller 303 can adjust (e.g., increase) an ACK window for receiving ACK frames from the transmitter device. In a non-limiting example, linear correction controller 303 can linearly adjust (e.g., increase) the ACK window using linear steps.

In some aspects, non-linear correction controller 305 can be configured to adjust and control the transmission power based on the encoded channel status information embedded within an ACK frame (the encoded ACK frame). According to some aspects, the transmitter device can receive the encoded ACK frame from the receiver device after the transmitter device transmitting a packet/frame to the receiver device. In a non-limiting example, the transmitter device can receive the encoded ACK frame after each unicast frame the transmitter device transmits to the receive device. As discussed above, the encoded ACK frame can include the link quality information as the encoded channel status information that is embedded within the ACK frame. An exemplary encoded ACK frame is discussed below with respect to FIG. 4.

Non-linear correction controller 305 can be configured to adjust and control the transmission power based on the link quality information in the encoded ACK frame. Non-linear correction controller 305 can use a control mechanism to adjust the transmission power. In a non-limiting example, the control mechanism can include a proportional-integral (PI) controller. For example $$P(t)=K_p*e+K_i*\Sigma e \quad (2)$$

In this example, P(t) is the transmission power for time (e.g., time slot) t. In this example, "e" is the error (e.g., the difference between the link margin and set point (LM−SP)). Also, $K_p$ is a coefficient used for proportional part of the PI controller and $K_i$ is the coefficient for the integral part of the PI controller. the weighted average. In some examples, $\Sigma e$ is the sum of a number of previous error values. The number of error values summed in $\Sigma e$ can be fixed or can be dynamically determined during the operation of non-linear correction controller 305. The aspects of this disclosure are not limited to the PI controller and other control mechanisms can be used for non-linear correction controller 305.

According to some aspects, non-linear correction controller 305 provides a fine correction/adjustment of the transmission power. In a non-limiting example, the fine adjustment is performed when the error (e.g., the difference between the link margin and set point (LM−SP)) is less than about 3 dB. However, the aspects of this disclosure can include other values of error for coarse adjustment. In a non-limiting example, link metrics controller 301 can be an absolute correction controller.

According to some aspects, power controller 230 can use one or more of link metrics controller 301, linear correction controller 303, and non-linear correction controller 305. For example, and as discussed above, power controller 230 of the transmitter device can use one or more of link metrics controller 301, linear correction controller 303, and non-linear correction controller 305 depending on the receiver device with which the transmitter device is communicating.

In one example, if the receiver device satisfies a first condition (such as, but not limited to, the transmitter and receiver devices not having the same manufacturer), power controller 230 can use link metrics controller 301 alone or in combination with linear correction controller 303 for transmission power control.

In another example, if the receiver device satisfies a second condition (such as, but not limited to, the transmitter and receiver devices not having the same manufacturer but the receiver device being a device associated with the transmitter device), power controller 230 can use non-linear correction controller 305 alone or in combination with linear correction controller 303 for transmission power control. In some examples, a receiver device being a device associated with transmitter device can include, for example, an accessory device that is to operate with the transmitter device but the transmitter and receiver devices do not have the same manufacturer.

In another example, if the receiver device satisfies a third condition (such as, but not limited to, the transmitter and receiver devices having the same manufacturer), power controller 230 can use two or more of link metrics controller 301, linear correction controller 303, and non-linear correction controller 305. For example, power controller 230 can use link metrics controller 301 and non-linear correction controller 305 (with or without linear correction controller 303) for transmission power control.

According to some aspects, when using the combination of link metrics controller 301 and non-linear correction controller 305 (with or without linear correction controller 303), link metrics controller 301 can operate periodically. For example, the transmitter device can periodically transmit link metrics probe requests to the receiver device to probe the receiver device to transmit the link metrics feedback (e.g., the link metrics probe response). In some examples, the intervals between the link metrics probe requests can be fixed intervals. Power controller 230 can use link metrics controller 301 for coarse correction and can use non-linear correction controller 305 for fine correction. Also, power controller 230 can use link metrics controller 301 for initialization of non-linear correction controller 305. For example, Ze (the sum of a number of previous error values) in equation (2) above can be initialized based on the transmission power determined by link metrics controller 301 as follows:

$$\Sigma e = P(t)/K_i \quad (3)$$

Here, P(t) is the transmission power determined by link metrics controller 301 and is used to initialize the PI controller of equation (2) of non-linear correction controller 305.

According to some aspects, when using the combination of link metrics controller 301 and non-linear correction controller 305 (with or without linear correction controller 303), link metrics controller 301 can be used when one or more conditions are satisfied (the opportunistic probing). In this example, power controller 230 can mainly use non-linear correction controller 305 and when the one or more conditions are satisfied, power controller 230 can then use link metrics controller 301. According to some aspects, the one or more conditions can be based on the current transmission power determined by power controller 230 and/or the link quality information determined by non-linear correction controller 305.

Figure 4:
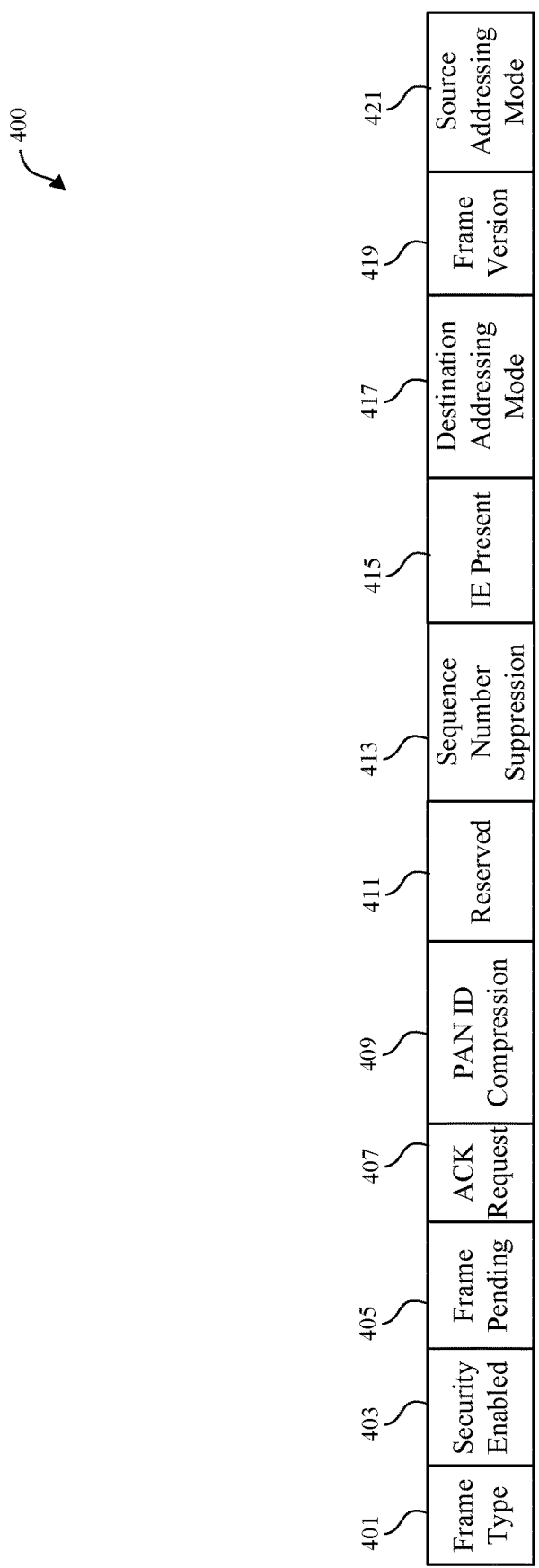
FIG. 4 illustrates a frame control field format, according to some aspects of the disclosure.

FIG. 4 illustrates a frame control field format, according to some aspects of the disclosure. Frame control field 400 can be part of one or more ACK frames transmitted by any of electronic devices 120 of system 100. For example, frame control field 400 can be part of one or more ACK frames transmitted from the receiver device to the transmitter device. Although some examples of this disclosure are discussed with respect to frame control field 400, the aspects of this disclosure are not limited to this format, and other formats and/or unused/do not care bit(s) in other frames can also be used.

An ACK frame can include frame control field 400, a duration field, one or more address fields, and frame check sequence (FCS) field. Frame control field 400, the duration field, and the one or more address field can be part of the medium access control (MAC) header of the ACK frame. The one or more address fields can include one or more of the ACK frame's transmitter's address or the ACK frame's receiver address(es). According to some aspects, the addresses can include MAC addresses.

Frame control field 400 can include frame type subfield 401 indicating the type of the frame such as, but not limited to, a data frame, a response frame, a MAC command frame, a beacon frame, and the like. In a non-limiting example, the duration of frame type subfield 401 can be 0-2 bits. Frame control field 400 can include security enable subfield 403, frame pending subfield 405, ACK request subfield 407, PAN ID compression subfield 409, reserved subfield 411, sequence number suppression subfield 413, information element (IE) subfield 415, destination addressing mode subfield 417, frame version subfield 419, and source addressing mode subfield 421. In some examples, subfields 403-415 can have a during of 1 bit and subfields 417-421 can have a duration of 2 bits. Frame control field 400 of the aspects of this disclosure can include other subfield and durations.

According to some aspects, frame control field 400 of the ACK frame can be used for encoding and embedding channel state information (e.g., the link quality information). For example, ACK request subfield 407 and/or reserved subfield 411 can be used to communicate the link quality information to the transmitter device. The link quality information can include, but is not limited to, RSSI, PER, SNR, link margin.

For example, request subfield 407 and reserved subfield 411 (representing the encoded channel status information) can be set to a first value to indicate to the transmitter device to keep its transmission power unchanged. In a non-limiting example, the first value can include "11" (e.g., request subfield 407 and reserved subfield 411 are set to "11"). In some examples, the receiver device can use the first value when the measured/determined link margin satisfies a first condition (e.g., being more than about 30 dB). However, the aspects of this disclosure can include other values.

Request subfield 407 and reserved subfield 411 (representing the encoded channel status information) can be set to a second value to indicate to the transmitter device to reduce its transmission power. In a non-limiting example, the second value can include "10" (e.g., request subfield 407 and reserved subfield 411 are set to "10"). In some examples, both the transmitter device and the receiver device know in advance the amount by which the transmitter device is to reduce its transmission power. Additionally, or alternatively, the receiver device can use, for example, the ACK frame to signal to the transmitter device the amount by which the transmitter device is to reduce its transmission power. In a non-limiting example, the amount by which the transmitter device is to reduce its transmission power can be about 0.5 dB. In some examples, the receiver device can use the second value when the measured/determined link margin satisfies a second condition (e.g., being between about 20 dB about 30 dB). However, the aspects of this disclosure can include other values for transmission power reduction and the second condition.

Request subfield 407 and reserved subfield 411 (representing the encoded channel status information) can be set to a third value to indicate to the transmitter device to increase its transmission power moderately. In a non-limiting example, the third value can include "01" (e.g., request subfield 407 and reserved subfield 411 are set to "01"). In some examples, both the transmitter device and the receiver device know in advance the amount by which the transmitter device is to increase its transmission power. Additionally, or alternatively, the receiver device can use, for example, the ACK frame to signal to the transmitter device the amount by which the transmitter device is to increase its transmission power. In a non-limiting example, the amount by which the transmitter device is to increase its transmission power can be about 2 dB. In some examples, the receiver device can use the third value when the measured/determined link margin satisfies a third condition (e.g., being between about 10 dB about 20 dB). However, the aspects of this disclosure can include other values for transmission power reduction and the third condition.

Request subfield 407 and reserved subfield 411 (representing the encoded channel status information) can be set to a fourth value to indicate to the transmitter device to increase its transmission power significantly. In a non-limiting example, the fourth value can include "00" (e.g., request subfield 407 and reserved subfield 411 are set to "00"). In some examples, both the transmitter device and the receiver device know in advance the amount by which the transmitter device is to increase its transmission power. Additionally, or alternatively, the receiver device can use, for example, the ACK ACK frame to signal to the transmitter device the amount by which the transmitter device is to increase its transmission power. In a non-limiting example, the amount by which the transmitter device is to increase its transmission power can be about 6 dB. In some examples, the receiver device can use the fourth value when the measured/determined link margin satisfies a fourth condition (e.g., being less than about 10 dB). However, the aspects of this disclosure can include other values for transmission power reduction and the fourth condition.

Figure 5:
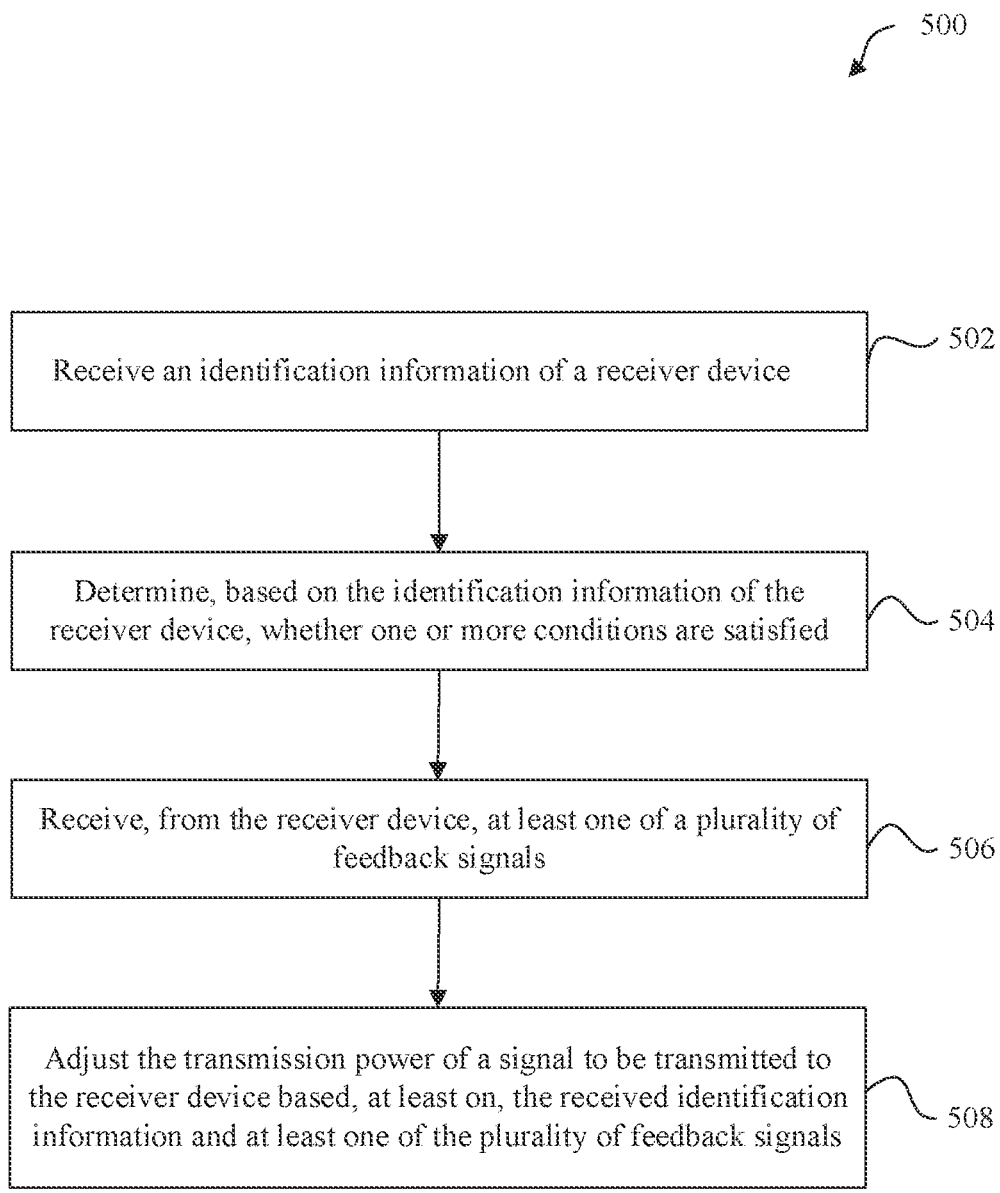
FIG. 5 illustrates an example method for a transmitter device to control and adjust its transmission power, according to some aspects of the disclosure.

FIG. 5 illustrates an example method 500 for a transmitter device to control and adjust its transmission power, according to some aspects of the disclosure. As a convenience and not a limitation, FIG. 5 may be described with regard to elements of FIGS. 1-4. Method 500 may represent the operation of an electronic device (e.g., a transmitted device such as device 120 of FIG. 1) implementing the transmission power control mechanisms. Method 500 may also be performed by system 200 of FIG. 2 and/or computer system 700 of FIG. 7. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, an identification information of a receiver device is received. For example, the transmitter device can receive the identification of the receiver device. In some examples, the transmitter device can receive the identification of the receiver device when these devices initiate their connection. Additionally, or alternatively, the transmitter device can receive the identification of the receiver device during the communication between these devices.

At 504, a determination is made, based on the identification information of the receiver device, whether one or more conditions are satisfied. In a non-limiting example, the transmitter device can determine, based on the identification information of the receiver device, whether the transmitter device and the receiver device belong to the same manufacturer. In some examples, if the transmitter and receiver devices do not belong to the same manufacturer, the transmitter device can determine whether the receiver device is a device associated with the transmitter device. In some examples, the identification information can include an identifier (ID) of the receiver device including, but not limited to, manufacturer ID, universal product code (PC), Stock Keeping Unit (SKU) code, and the like. However, the aspects of this disclosure can include other information for identification information of the receiver device.

At 506, at least one of a plurality of feedback signals are received from the receiver device. For example, the transmitter device receives the at least one of a plurality of feedback signals. In some examples, the plurality of feedback signals can include a first feedback signal generated based on a link quality query from the transmitter device. The first feedback signal can include the link metrics feedback. As discussed above, the transmitter device can generate and transmit the link metrics probe request (e.g., the link quality query) to the receiver device. In response, the receiver device can measure the link, generate the link metrics probe response, and transmit the link metrics probe response to the transmitter device. The link metrics probe response includes the link metrics feedback.

In some examples, the plurality of feedback signals can include a second feedback signal including the encoded channel status information embedded within an ACK frame from the receiver device. As discussed above, the ACK frame can include a frame control field that can encode the link quality information determined by the receiver device.

In some examples, the plurality of feedback signals can include a third feedback signal including a NACK packet and/or lack of the ACK packet.

At 508, the transmission power of a signal to be transmitted to the receiver device is adjusted based, at least on, the received identification information and at least one of the plurality of feedback signals. As discussed in operation 504, the identification information of the receiver device can be used to determine whether one or more conditions are satisfied. For example, if the received identification information satisfies a first condition (such as, but not limited to, the transmitter and receiver devices not having the same manufacturer), the transmitter device can use the first feedback signal alone or in combination with the third feedback signal. In another example, if the received identification information satisfies a second condition (such as, but not limited to, transmitter and receiver devices not having the same manufacturer but the receiver device is a device associated with the transmitter device), the transmitter device can use the second feedback signal alone or in combination with the third feedback signal.

In another example, if the received identification information satisfies a third condition (such as, but not limited to, transmitter and receiver devices having the same manufacturer), the transmitter device can use at least two of the first, second, and third feedback signals. For example, the transmitter device can use the first and second control signal (with or without the third control signals).

According to some aspects, when using the combination of the first and second feedback signal (with or without the third feedback signal), the transmitter device can periodically generate link metrics probe requests and receive link metrics probe responses. Additionally, or alternatively, the transmitter device can generate link metrics probe requests and receive link metrics probe responses when one or more conditions are satisfied (the opportunistic probing). According to some aspects, the one or more conditions can be based on the current transmission power determined by power controller 230 of the transmitter device and/or the link quality information determined based on the second feedback signal.

According to some aspects, method 500 can also include further adjusting the transmission power based on sensor data from one or more sensors. In some examples, the sensor data can include data from one or more motion sensors. The sensor data can indicate whether the transmitter device is moving. Additionally, or alternatively, the sensor data can indicate a distance (e.g., an approximate distance) that the transmitter device has moved within a time period, can indicate the speed (e.g., an approximate speed) of the transmitter device, and/or can indicate an acceleration (e.g., an approximate acceleration) of the transmitter device. The transmitter device can use the sensor data to further adjust its transmission power. For example, if the transmitter device determines (using, for example, the sensor data) that it is moving, the transmitter device can increase its transmission power. In some examples, the transmitter device can adjust (e.g., increase transmission power or disable power control) its transmission power based on the transmitter device's speed, acceleration, and the like. This disclosure is not limited to these examples, and the transmitter device can use other mechanisms to adjust its transmission power based on the sensor data.

Figure 6:
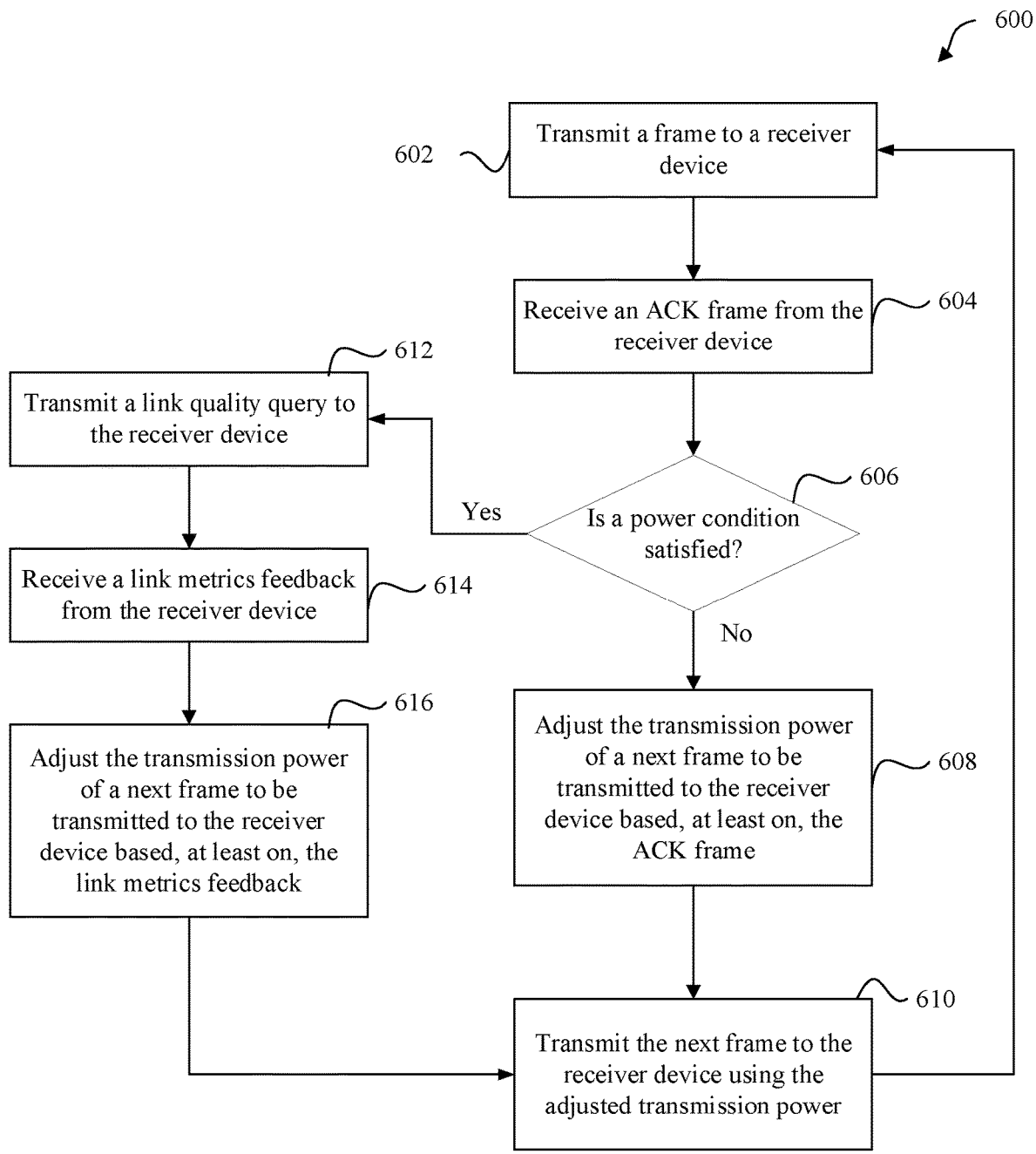
FIG. 6 illustrates an example opportunistic probing method for a transmitter device to control and adjust its transmission power, according to some aspects of the disclosure.

FIG. 6 illustrates an example opportunistic probing method 600 for a transmitter device to control and adjust its transmission power, according to some aspects of the disclosure. As a convenience and not a limitation, FIG. 6 may be described with regard to elements of FIGS. 1-5. Method 600 may represent the operation of an electronic device (e.g., a transmitted device such as device 120 of FIG. 1) implementing the opportunistic probing mechanisms for transmission power control. Method 600 may also be performed by system 200 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6. According to some aspects, method 600 can be at least part of operations 506 and 508 of FIG. 5.

According to some aspects, using link metrics probe request and response is an absolute correction method for transmission power control, while using encoded ACK frame is a relative correction method for transmission power control. In some examples, using link metrics probe request and response can be expensive for the transmitted device, but can result in faster power correction. Therefore, the opportunistic probing is performed when the transmission power control can be performed faster than just using the encoded ACK frame, according to some aspects. In other words, the transmitter device can determine whether one or more power conditions (e.g., sufficient link margin) are satisfied to use link metrics probing in combination with encoded ACK frame(s) to increase the efficiencies of the transmitter device's transmission power control.

At 602, a frame is transmitted to a receiver device. For example, the transmitter device can generate and transmit a frame to the receiver device. The frame can include, but is not limited to, a data frame (e.g., including data packet(s)), a control frame, a management frame, and the like.

At 604, an ACK frame is received from the receiver device. For example, the transmitter device receives the ACK frame in response to the transmitted frame. In some examples, the receiver device can transmit an ACK frame in response to each frame from the transmitter device. In some examples, the receiver device can transmit an ACK frame in response to each unicast data frame from the transmitter device. According to some aspects, the ACK frame can include the encoded channel status information embedded within the ACK frame. In other words, the ACK frame is the encoded ACK frame.

At 606, it is determined whether one or more power conditions are satisfied. For example, the transmitter device can determine whether one or more power conditions are satisfied. According to some aspects, the one or more power conditions can be based on the transmission power used for transmitting the frame at 602 and/or the link quality information in the received encoded ACK frame. According to some aspects, method 600 can use a consecutive number of received encoded ACK frame (in addition to the previous transmission powers) to determine whether the power condition is satisfied.

If the power condition is not satisfied, method 600 moves to operations 608 and 610 where the link quality information in the received encoded ACK frame is used to adjust the transmission power. If the power condition is satisfied, method 600 moves to operations 612-616 where link metrics feedback is used to adjust the transmission power. In some examples, the opportunistic probing is performed when the link margin satisfies a condition. For example, the opportunistic probing is performed when the link margin is greater than a threshold. In a non-limiting example, the threshold can be 10 dB. However, the aspects of this disclosure are not limited to this example and can include other threshold for link margin.

In a non-limiting example, if the transmission power used for transmitting the frame at 602 is at its highest value and the received encoded ACK frame indicates to the transmitter device to reduce its power, the power condition is satisfied and method 600 moves to operations 612-616. In this example, a maximum transmission power is used by the transmitter device, and the received one or more (e.g., continuous) encoded ACK frames indicates to the transmitter device to reduce its power. This can be a trigger to perform the opportunistic probing, according to some aspects.

In another non-limiting example, if the transmission power used for transmitting the frame at 602 is at its lowest value and the received encoded ACK frame indicates to the transmitter device to reduce its power, the power condition is not satisfied and method 600 moves to operations 608-610. In this example, a minimum transmission power is used by the transmitter device, and the received one or more (e.g., continuous) encoded ACK frames indicates to the transmitter device to reduce its power. This does not trigger the opportunistic probing, according to some aspects.

In another non-limiting example, if the transmission power used for transmitting the frame at 602 is at its highest value and the received encoded ACK frame indicates to the transmitter device to increase its power, the power condition is not satisfied and method 600 moves to operations 608-610. In this example, a maximum transmission power is used by the transmitter device, and the received one or more (e.g., continuous) encoded ACK frames indicates to the transmitter device to increase its power. This does not trigger the opportunistic probing, according to some aspects.

In another non-limiting example, if the transmission power used for transmitting the frame at 602 is at its lowest value and the received encoded ACK frame indicates to the transmitter device to increase its power, the power condition is satisfied and method 600 moves to operations 612-616. In this example, a minimum transmission power is used by the transmitter device, and the received one or more (e.g., continuous) encoded ACK frames indicates to the transmitter device to increase its power. This can be a trigger to perform the opportunistic probing, according to some aspects.

The above scenarios are provided as examples and the aspects of this disclosure can include other scenarios that can satisfy the condition at operation 606.

If the power condition is not satisfied at 606, the transmission power for a next frame to be transmitted to the receiver device is adjusted based, at least, on the received encoded ACK frame (and its associated link quality information) at 608. Exemplary methods for adjusting the transmission power based, at least, on the received encoded ACK frame are discussed above with respect to, for example, non-linear correction controller 305 of FIG. 3 and the frame control field format of FIG. 4. According to some examples, if the transmission power cannot be adjusted (e.g., the transmission power is at its highest value and the received encoded ACK frame indicates to the transmitter device to increase its power or transmission power is at its lowest value and the received encoded ACK frame indicates to the transmitter device to reduce its power), the current value of transmission power is used for the next frame. At 610, the next frame is transmitted, by the transmitter device, to the receiver device using the adjusted (or the non-adjusted) transmission power.

If the power condition is satisfied at 606, a link quality query is transmitted to the receiver device at 612. For example, the transmitter device transmits a link metrics probe request to the receiver device.

At 614, a link metrics feedback is received from the receiver device. For example, the transmitter device receives a link metrics probe response from the receiver device. At 616, the transmission power for a next frame to be transmitted to the receiver device is adjusted based, at least, on the received link metrics feedback (and its associated link quality information). Then method 600 moves to 610 where the next frame is transmitted, by the transmitter device, to the receiver device using the adjusted transmission power.

Figure 7:
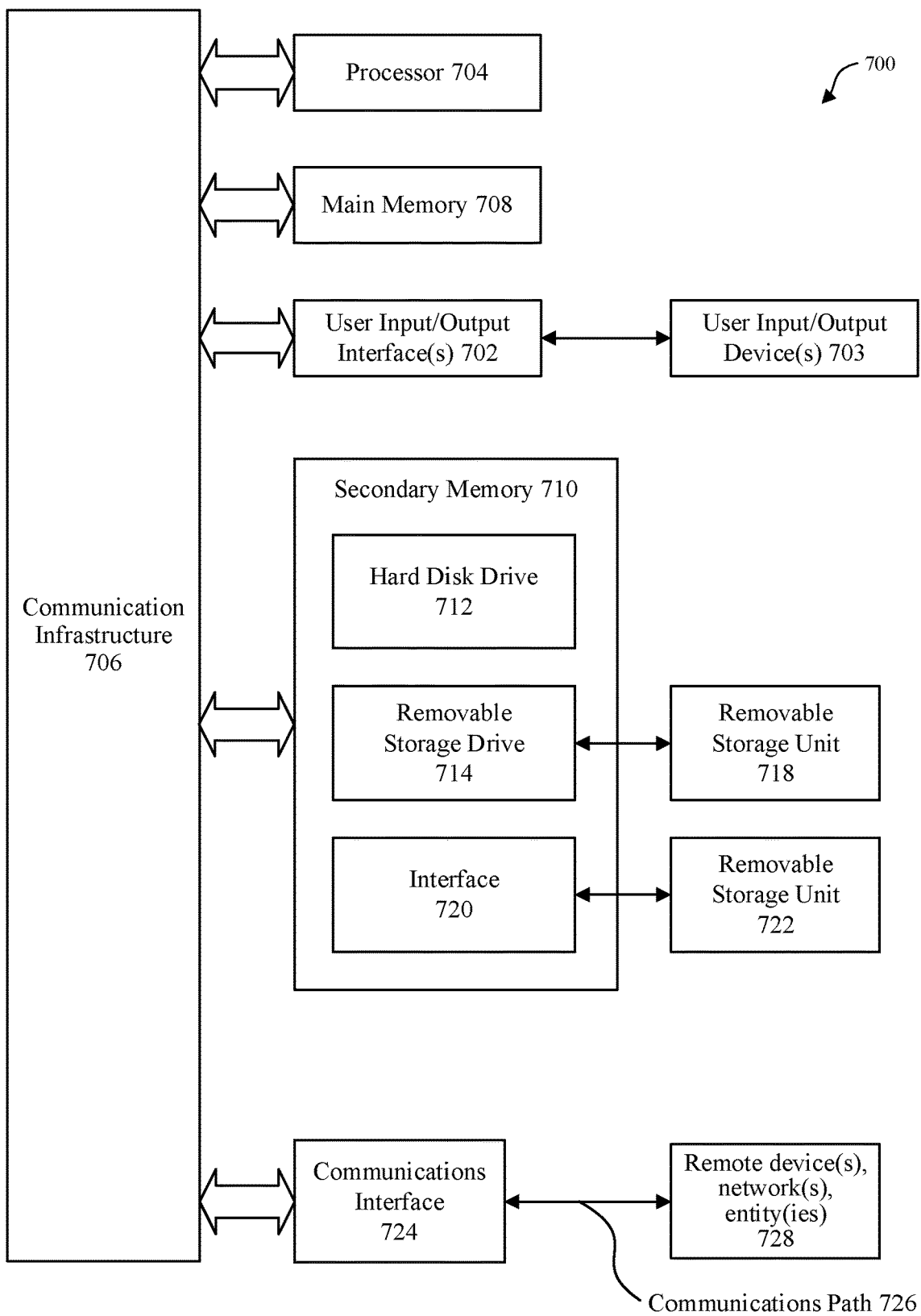
FIG. 7 illustrates an example computer system for implementing some aspects of the disclosure or portion(s) thereof.

Various aspects can be implemented, for example, using one or more computer systems, such as computer system 700 shown in FIG. 7. Computer system 700 can be any well-known computer capable of performing the functions described herein such as devices 120 of FIG. 1, system 200 of FIG. 2, and/or power controller 230 of FIG. 3. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
   a transceiver configured to communicate with a second electronic device; and
   a processor communicatively coupled to the transceiver and configured to:
   receive an identification information of the second electronic device;
   receive, from the second electronic device, at least one of a plurality of feedback signals, wherein the plurality of feedback signals comprise:
   a first feedback signal generated based on a link quality query from the electronic device; and
   a second feedback signal comprising an encoded channel status information embedded within an acknowledgment (ACK) frame from the second electronic device;
   adjust a transmission power of a signal to be transmitted to the second electronic device based on the at least one of the plurality of feedback signals in response to the received identification information satisfying a condition; and
   generate the link quality query for the first feedback signal based on a third feedback signal associated with a previous time interval and a transmission power associated with a signal transmitted in the previous time interval.

2. The electronic device of claim 1, wherein the processor is further configured to:
   determine that the third feedback signal associated with the previous time interval and the transmission power associated with the signal transmitted in the previous time interval satisfy a second condition;
   in response to the determination, generate the link quality query for the first feedback signal;
   transmit, using the transceiver, the link quality query to the second electronic device;
   receive, using the transceiver, the first feedback signal from the second electronic device; and
   adjust, based on the first feedback signal, the transmission power of the signal to be transmitted to the second electronic device.

3. The electronic device of claim 1, wherein:
   the processor is configured to adjust the transmission power using a control mechanism applied to the second feedback signal, and
   the control mechanism is initialized using the first feedback signal.

4. The electronic device of claim 1, wherein the encoded channel status information is encoded in a frame control field of the ACK frame from the second electronic device.

5. The electronic device of claim 4, wherein:
   the encoded channel status information representing a first value indicates that the transmission power is to be unchanged,
   the encoded channel status information representing a second value indicates that the transmission power is to be reduced by a first amount,
   the encoded channel status information representing a third value indicates that the transmission power is to be increased by a second amount, and
   the encoded channel status information representing a fourth value indicates that the transmission power is to be increased by a third amount different from the second amount.

6. The electronic device of claim 1, wherein the processor is configured to adjust the transmission power based on the received identification information, the at least one of the plurality of feedback signals, and no ACK frame from the second electronic device in response to the signal transmitted to the second electronic device.

7. The electronic device of claim 1, further comprising:
   a sensor configured to generate sensor data,
   wherein the processor is configured to adjust the transmission power based on the received identification information, the at least one of the plurality of feedback signals, and the sensor data.

8. The electronic device of claim 7, wherein the sensor comprises a motion sensor and the sensor data comprises information associated with a motion of the electronic device.

9. A method, comprising:
   receiving, using a first electronic device, an identification information of a second electronic device;
   receiving, using the first electronic device and from the second electronic device, at least one of a plurality of feedback signals, wherein the plurality of feedback signals comprise:
   a first feedback signal generated based on a link quality query from the first electronic device; and
   a second feedback signal comprising an encoded channel status information embedded within an acknowledgment (ACK) frame from the second electronic device;
   based on the received identification information and the at least one of the plurality of feedback signals, adjusting a transmission power of a signal to be transmitted to the second electronic device, wherein:
   adjusting the transmission power comprises adjusting the transmission power using a control mechanism applied to the second feedback signal, and
   the control mechanism is initialized using the first feedback signal.

10. The method of claim 9, wherein adjusting the transmission power comprises adjusting the transmission power based on the first feedback signal and the second feedback signal in response to the received identification information satisfying a condition.

11. The method of claim 10, further comprising:
    determining that a second feedback signal associated with a previous time interval and a transmission power associated with a signal transmitted in the previous time interval satisfy a second condition;
    in response to the determination, generating the link quality query for the first feedback signal;
    transmitting, using the first electronic device, the link quality query to the second electronic device;
    receiving, using the first electronic device, the first feedback signal from the second electronic device; and
    adjusting, based on the first feedback signal, the transmission power of the signal to be transmitted to the second electronic device.

12. The method of claim 9, wherein:
the encoded channel status information is encoded in a frame control field of the ACK frame from the second electronic device,
the encoded channel status information representing a first value indicates that the transmission power is to be unchanged,
the encoded channel status information representing a second value indicates that the transmission power is to be reduced by a first amount,
the encoded channel status information representing a third value indicates that the transmission power is to be increased by a second amount, and
the encoded channel status information representing a fourth value indicates that the transmission power is to be increased by a third amount different from the second amount.

13. The method of claim 12, wherein adjusting the transmission power comprises adjusting the transmission power based on the received identification information, the at least one of the plurality of feedback signals, and sensor data from a motion sensor of the first electronic device.

14. A non-transitory computer-readable medium storing instructions that, when executed by a processor of an electronic device, cause the electronic device to perform operations comprising:
receiving an identification information of a second electronic device;
receiving, from the second electronic device, at least one of a plurality of feedback signals, wherein the plurality of feedback signals comprises:
a first feedback signal generated based on a link quality query from the electronic device; and
a second feedback signal comprising an encoded channel status information embedded within an acknowledgment (ACK) frame from the second electronic device;
based on the received identification information and the at least one of the plurality of feedback signals, adjusting a transmission power of a signal to be transmitted to the second electronic device, wherein:
adjusting the transmission power comprises adjusting the transmission power using a control mechanism applied to the second feedback signal, and
the control mechanism is initialized using the first feedback signal.

15. The non-transitory computer-readable medium of claim 14, the operations further comprising:
determining that a second feedback signal associated with a previous time interval and a transmission power associated with a signal transmitted in the previous time interval satisfy a condition;
in response to the determination, generating the link quality query for the first feedback signal;
transmitting the link quality query to the second electronic device;
receiving the first feedback signal from the second electronic device; and
adjusting, based on the first feedback signal, the transmission power of the signal to be transmitted to the second electronic device.

16. The non-transitory computer-readable medium of claim 14, wherein adjusting the transmission power comprises adjusting the transmission power based on the received identification information, the at least one of the plurality of feedback signals, and sensor data from a motion sensor of the electronic device.

* * * * *